Aug. 27, 1935.  A. S. MARCHUS  2,012,540
TIRE GAUGE
Filed Dec. 21, 1931  2 Sheets-Sheet 1
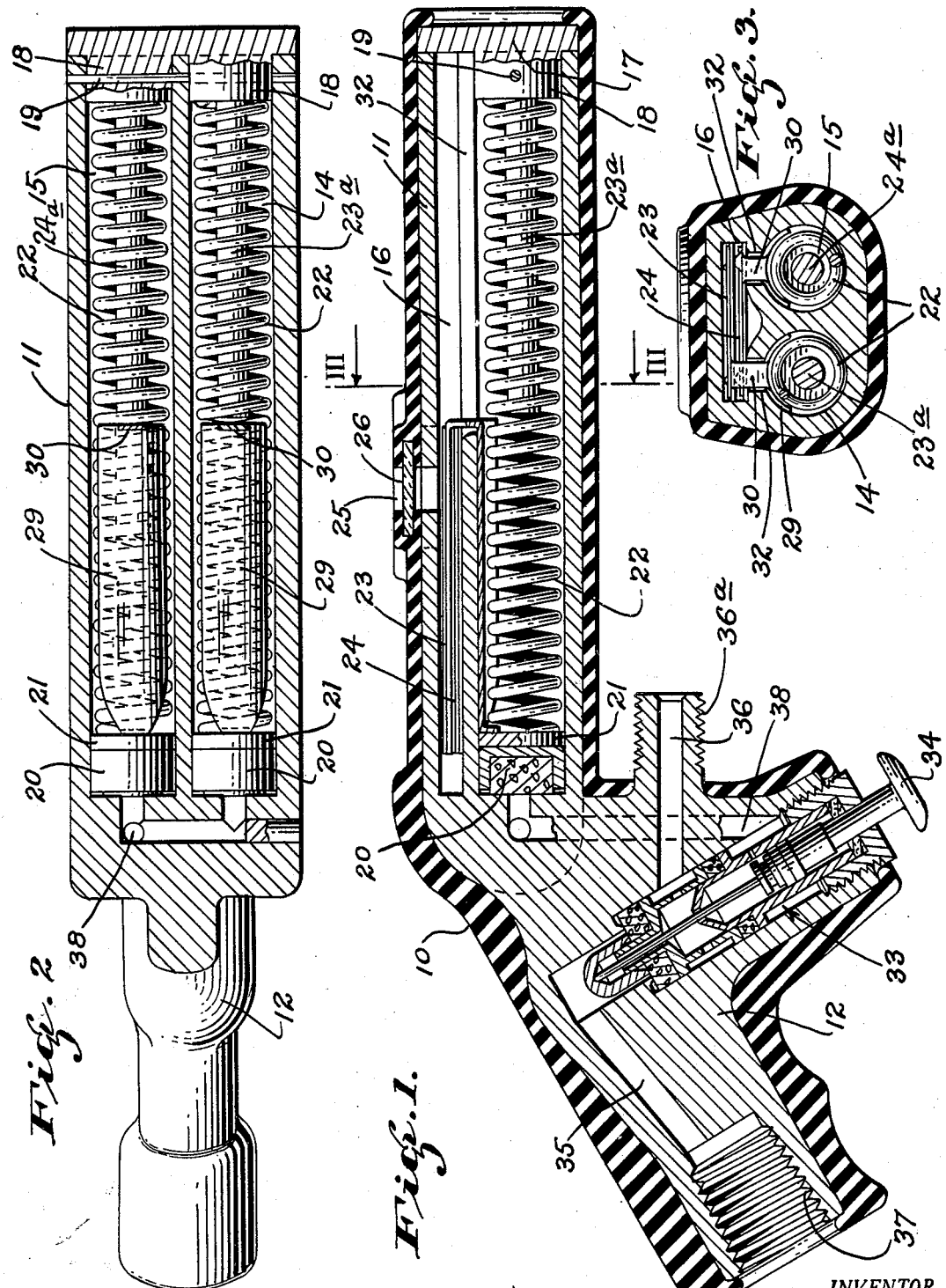
INVENTOR.
Amos S. Marchus
BY Townsend & Loftus
ATTORNEYS.

Aug. 27, 1935.    A. S. MARCHUS    2,012,540
TIRE GAUGE
Filed Dec. 21, 1931    2 Sheets-Sheet 2
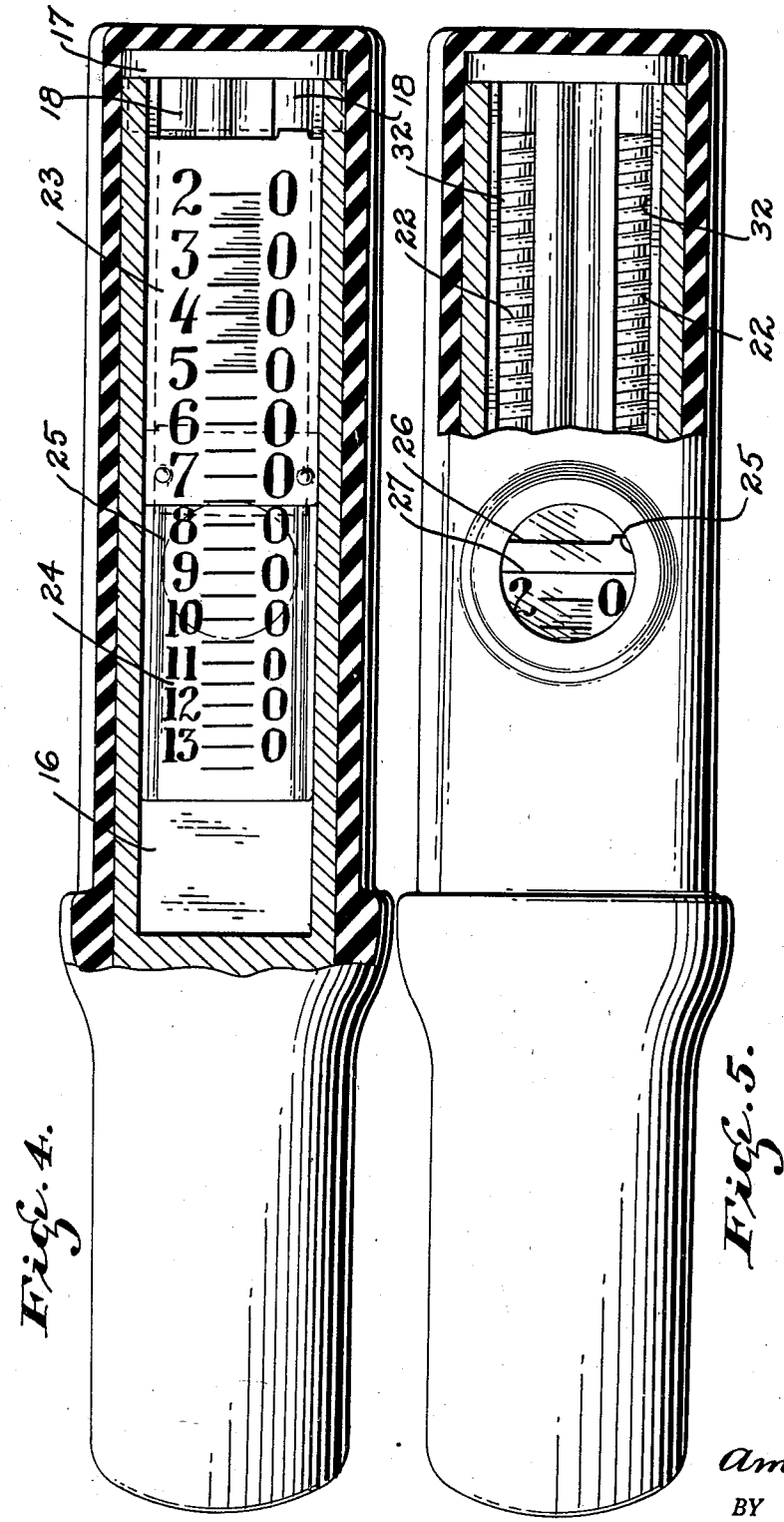
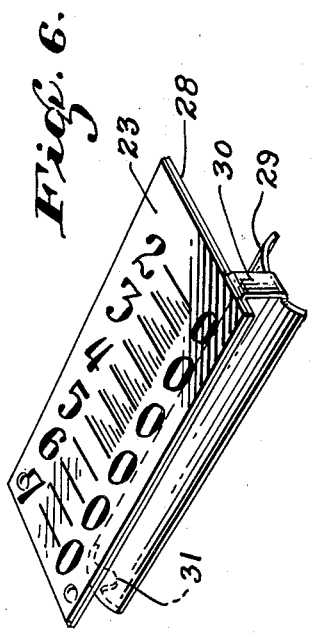
INVENTOR.
Amos S. Marchus
BY
Townsend & Loftus
ATTORNEYS.

Patented Aug. 27, 1935

2,012,540

UNITED STATES PATENT OFFICE 2,012,540

TIRE GAUGE

Amos S. Marchus, Oakland, Calif.

Application December 21, 1931, Serial No. 582,203

9 Claims. (Cl. 73—111)

This invention relates to a combined tire inflating valve and gauge mechanism for use in automobile service stations for inflating and testing vehicle tires.

It is the principal object of the present invention to provide an improved gauge mechanism for devices of the character referred to which is capable of accurately indicating pressures through a wide pressure range enabling it to be used in testing both extremely low and extremely high pressure tires; which gauge mechanism is simple and compact and not likely to become inaccurate or out of order.

In carrying the invention into practice, I have provided a combined tire inflating valve and gauge mechanism which includes a pair of plunger chambers arranged in parallelism, the air supply to which is common to both. Arranged in each chamber is a plunger held in a normal position by means of a spring. The plungers are connected to dials which are arranged in telescopic relation and the calibrations of which are visible through a sight opening in the barrel. The springs are so constructed that they will be initially influenced by different pressures in order that the dials will be successively operated; that is to say, one dial indicates the range of low pressures and when this maximum is reached the second dial commences to operate to indicate the range of comparatively high pressures.

One form which the invention may assume is exemplified in the following description and illustrated by way of example in the accompanying drawings in which:

Fig. 1 is a view in central longitudinal section through a device embodying my invention.

Fig. 2 is a plan section taken through the barrel of the device and illustrating the plunger bores, with the plunger mechanisms mounted therein.

Fig. 3 is a transverse sectional view through the barrel of the device taken on line III—III of Fig. 1.

Fig. 4 is a view in plan with one wall of the barrel removed to illustrate the dial chamber with the dials mounted therein.

Fig. 5 is a similar view showing the sight opening in the top wall of the barrel and with a part of such wall broken away to illustrate the formation of the dial chamber.

Fig. 6 is a perspective view of one of the dials.

Referring more particularly to the accompanying drawings, the combined tire gauge and filling valve embodying my invention includes a body 10 which is substantially pistol shaped and preferably formed by die casting. The body 10 includes a barrel portion 11 and a grip portion 12.

The barrel 11 is formed with two parallel plunger bores 14 and 15 which extend inwardly from the outer end of the barrel and terminate short of the inner end of the barrel. Above the plunger bores the barrel is formed with a shallow dial chamber 16 which overlies the plunger chambers and extends the length thereof in parallelism therewith. The outer ends of the plunger bores and the dial chamber are plugged by a cap piece 17 fitted to the end of the barrel as illustrated. This cap piece has two cylindrical lugs 18 which register with and project into the outer ends of the plunger bores as shown. The cap piece 17 is secured in position by a transverse pin 19 which extends transversely through the barrel and the cylindrical lugs.

Arranged in each plunger bore at the inner end thereof is a plunger 20, a disc 21 and a plunger spring 22.

Arranged in the dial chamber are two dials 23 and 24. The dial 23 overlies the dial 24 as illustrated in the drawings. These dials are both calibrated, the dial 23 being calibrated from 20 to 70 while the dial 24 is calibrated from 80 to 130. In the present instance these calibrations indicate pounds of air pressure. However, it is understood that calibrations may indicate such units of pressure as may be desired.

The wall of the barrel overlying the dial chamber is formed with a circular sight opening 25 through which the dials are visible. This dial opening is covered by a transparent sight glass 26 having a mark 27 suitably imprinted thereon with which the calibrations cooperate to indicate the pressure influencing the position of the dials.

The dials 23 and 24 successively operate so that the gauge mechanism is capable of indicating pressures through a pressure range from 20 to 130 pounds. This wide range of pressure indication enables the device to be used in connection with low pressure tires and on comparatively high pressure tires such as utilized by trucks, stage coaches and the like.

In order that the dials will operate successively, the springs 22 of the two plunger chambers are susceptible of being operated by different pressures, that is, the spring 22 in the plunger bore 14 will be susceptible of compression through a pressure range of from 20 to 70 pounds, while a pressure under 70 pounds will not substantially compress the spring in the plunger bore 15. Therefore, when air pressure from a common source is exerted against the plungers of both plunger bores, if the pressure is below 70 pounds the spring in the plunger chamber 14 alone will be compressed so as to actuate the dial 23. However, when the pressure reaches 70 pounds it will compress the spring in the bore 15 and actuate the dial 24.

Therefore, if the pressure is increasing, the dial 23 will first display its calibrations in the sight opening 25 and after the pressure has reached 70 pounds, or the maximum calibration on the dial 23, it will uncover the dial 24 and the latter will commence operation to display its calibrations in the sight opening. This is possible due to the fact that the dials are independent of each other and the dial 24 may telescope over the dial 23. In its normal position, the dial 24 is arranged with its calibration 80 in register with the fixed mark on the sight glass.

Reference being had to Fig. 6, it will be seen that each dial comprises a flat dial plate 28 and a guide member 29 spaced therefrom, but arranged in parallelism therewith. The dial plate is connected to the guide member 29 at one end by a vertical member 30. The dials are made left and right-hand so that the guide member 29 of one dial will fit within one plunger bore, while the guide member 29 of the opposite dial will fit within the opposite plunger bore, but the dial plates 28 will be in register in overlying relation.

It will be seen that the guide member 29 of each dial plate is transversely curved on a radius conforming with the radius of the plunger bore and is reciprocably mounted therein. At the end of each guide member 29 opposite the point where it is connected with the dial plate 28, the same is formed with an inwardly turned tab 31 which is interposed between one end of the spring in the plunger bore and the adjacent plunger so that the dial will operate simultaneously with the plunger.

To accommodate the connections 30 between the dial plates 28 and their guide members 29, longitudinal slots 32 are formed in the wall between the plunger bores and the dial chamber as illustrated.

From the foregoing it is obvious that when pressure from a common source is exerted against the plungers of the plunger cylinders, that the dials will operate successively to indicate pressures from 20 to 130 pounds, or any other pressures throughout a large range depending upon the formation of the plunger springs in the chambers 14 and 15.

The grip portion 12 of the body 10 is fitted with a valve mechanism 33 having an actuating trigger 34. This valve mechanism controls the flow of air from an inlet passageway 35 to a discharge passageway 36 which may be connected to any suitable conduit for connection with a tire stem. The inlet passageway 35 communicates with a threaded bore 37 which may be connected to a hose or other conduit with a source of air supply under pressure. The valve mechanism 33 also controls the flow of air from the tire through the discharge passageway 36 to a passageway 38 leading from the valve mechanism 33 to a point at the inner ends of the plunger bores 14 and 15 where it will be exerted against the plungers in said chambers. It will be noticed that the passageway 38 is common to both of the plunger bores 14 and 15.

In operation of the valve mechanism 33 when the trigger 34 is depressed communication is established between the inlet passageway 35 and the discharge passageway 36 so that air under pressure will be delivered from the source of supply to the tire. When the trigger 34 is released, the valve mechanism shuts off communication between the inlet passageway 35 and the discharge passageway 36 and establishes communication between the discharge passageway 36 and the passageway 38, so that the air pressure of the tire will pass through the passageway 38 and exert its pressure against the plungers in the plunger chambers 14 and 15. This pressure exerted against the plungers will operate the same and the dials to indicate the amount of pressure in the tire.

The valve mechanism 33 forms no part of the present invention and is fully described and claimed in my Patent No. 1,892,435 for Combined tire gauge and filling valve, issued December 27, 1932.

To protect the valve and gauge mechanism from shocks incident to hard usage and also for the purpose of protecting the user's hand in extreme hot and cold weather and to protect the mechanism from the elements, the entire body 10 is enclosed by a rubber covering vulcanized thereon. This feature is fully described and claimed in my Reissue Patent No. 19,252 for Combined tire gauge and filling valve, issued July 24, 1934.

In operation of the device, it is constructed and assembled as illustrated and described and the bore 37 is connected to an air supply hose associated with the source of air under pressure. The nipple 36a through which the discharge passageway 36 extends is also fitted with an air discharge hose having a tire valve fitting at its extremity which may be applied to a tire valve stem of an automobile tire to open the valve therein and establish communication between the passageway 36 and the interior of the tire.

When the trigger 34 of the valve mechanism 33 is depressed, communication is established between the inlet passageway 35 and the discharge passageway 36 and air under pressure will be delivered and injected into the tire.

When the trigger 34 is released, the air under pressure causes it to project to its normal position simultaneously interrupting communication between the inlet passageway 35 and the discharge passageway 36. In this position of the trigger, assuming that the tire valve fitting is still associated with the tire valve stem, communication is established between the discharge passageway 36 and the passageway 38 so that the pressure from the tire will pass through the discharge passageway 36, the valve mechanism 33 and passageway 38 and impinge against the plungers in the plunger bores 14 and 15.

As the pressure rises, the plunger in the bore 14 will commence to move coaxially of the bore and display its calibrations in the sight opening 25.

When the pressure reaches 70 pounds or the last calibration thereon, this last calibration will be in register with the fixed mark 27 on the sight glass 26. The dial 23 then commences to uncover the dial 24 until the latter displays its first calibration so, then the increase pressure commences operating the other plunger and the dials move simultaneously for a short distance until the outer end of the dial 23 engages a fixed stop 23a and will be held from further movement. As the pressure increases from 80 pounds, the plunger in the plunger bore 15 continues operation and the dial 24 will commence to telescope under the dial 23, and continue to operate until the pressure reaches 130 pounds.

When this pressure is reached, the dial 24 will have moved the full amount of its travel and will engage the stop 24a which will prevent further movement of this dial.

When the tire fitting is disconnected from the valve stem on the tire, the pressure in the passageway 38 will be relieved through the valve mechanism and the springs in the plunger chambers 14 and 15 will return the dials to their starting position.

In the event that during the operation of the device pressure declines gradually the dial 24 will first return to normal position, the pressure continues to lower, the dial 23 will commence returning to normal position so that the dials will operate accurately both when the pressure increases and as the pressure decreases.

From the foregoing, it is obvious that I have provide a very simple and efficient combined tire gauge and filling valve which will operate accurately through a wide pressure range and which will be compact in construction, comparatively inexpensive to manufacture and which will not easily become out of order or inaccurate.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described including a body having a pair of plunger bores formed therein, said body being formed with an air delivery means for said bores, said means being common to both bores, a plunger in each bore, a spring in each bore resisting movement of the plungers in one direction, said springs being intially influenced by different pressures whereby one plunger will operate subsequently to the other, and separate indicating means one superimposed over the other connected with the plungers and operated successively thereby for movement longitudinally of the body, said indicating means being calibrated, said body having a sight opening formed therethrough through which the calibrations of the indicating means are successively displayed.

2. A deviec of the character described including a body having a pair of plunger bores formed therein in side by side relation, said body being formed with an air delivery passageway common to both plunger bores, a plunger in each bore, a spring in each bore, said springs resisting movement of the plungers caused by the exertion of air pressure thereagainst from the air delivery passageway, said springs being initially influenced by different pressures whereby one plunger will commence to operate subsequently to the other, said body having a dial chamber overlying the bores and a single opening bearing an indicator, a pair of dials reciprocably mounted in said chamber for movement in parallelism to the axis of the bores, one of said dials overlying the other whereby the lower dial is concealed until the upper one has been moved substantially its entire indicating distance past said opening, said dials being connected to the plungers through slots extending along one end portion of the bores placing the same in communication with the chamber whereby the dials will be successively operated, said dials being calibrated, said body having a sight opening through which said dials are visible.

3. A pressure gauge comprising a body member, a pair of calibrated superposed dials therein, a sight opening in the body member past which the dials may move, means for moving one of said dials past the sight opening when the gauge is affected by pressures up to a predetermined point, and means for moving the other dial past said opening when the gauge is affected by pressures above said point, the lower dial being concealed until the upper dial has been moved substantially its entire indicating range.

4. In combination with a pressure gauge having two members each responsive to pressures within different ranges, a calibrated dial connected with each of said members for movement therewith, and an indicating point for cooperation with the calibrations on said dials, said dials being superposed whereby one dial will be hidden from view at said indicating point until the other dial has been moved past the point.

5. In a device of the character described including a body having a plunger bore formed therein, said body being formed with an air delivery passageway to the plunger bore, a plunger in the bore, a spring in the bore, said spring resisting movement of the plunger caused by the exertion of air pressure thereagainst from the air delivery passageway, said body having a dial chamber formed therein in parallelism to the bore and to one side thereof, a dial mounted in the dial chamber and reciprocable in a path parallel to the bore, the dial being connected to the plunger through an opening between the bore and chamber placing the same in communication, said dial being calibrated to indicate the pressure exerted against the plunger, said body having a sight opening formed through the outer wall of the dial chamber and through which said dial is visible.

6. A device of the character described including a barrel having a plunger bore formed therein, said barrel having an air delivery passageway to the bore and communicating therewith at one end thereof, a plunger reciprocably mounted in the bore, a coiled spring in the bore interposed between the plunger and the end of the bore opposite the end communicating with said passageway, said barrel being formed with a dial chamber overlying the bore, an opening being provided between the bore and chamber placing the same in communication; a dial reciprocably mounted in said dial chamber and connected with said plunger through said opening for reciprocation simultaneously with the reciprocation of the plunger, said dial being calibrated, said barrel being formed with a sight opening through which the calibrations of the dial register as the dial is operated by the action of the plunger.

7. In an air gauge of the character described comprising a casing having a low pressure and a high pressure plunger therein, a calibrated dial movable by each of said plungers, said dials being superposed, an indicating point fixed on the casing, said dials being arranged to be moved by said plungers in successive order to present a continuously calibrated scale at said indicating point.

8. In an air gauge, an elongated body member having a bore, a spring pressed plunger in said bore, said body member being provided with an internal guide means extending longitudinally thereof, and an indicator constantly inclosed in said body and actuated by said plunger to slide longitudinally of the body, said indicator engaging said guide means and being retained against twisting movement thereby, and a sight window in said body member through which the indicator is visible.

9. In an air gauge a body member having a bore, a spring resisted plunger in said bore, a dial chamber parallel to said bore, the body member being slotted to provide a guide between the dial chamber and one end portion of the bore, a dial slidable in the dial chamber, means connecting the dial and the plunger and slidable in said guide to cause the dial to reciprocate with the plunger and to prevent the dial from twisting in its chamber and a sight window in said dial chamber through which the dial is visible.

AMOS S. MARCHUS.

DISCLAIMER 2,012,540.—*Amos S. Marchus*, Oakland, Calif. TIRE GAUGE. Patent dated August 27, 1935. Disclaimer filed November 29, 1943, by the inventor.
Hereby enters this disclaimer to claim 8 of said patent.
*[Official Gazette December 21, 1943.]*